(12) United States Patent
Dvorkin et al.

(10) Patent No.: US 7,594,053 B2
(45) Date of Patent: Sep. 22, 2009

(54) ADAPTIVE OBJECT LEVEL LOCKING

(75) Inventors: Mike Dvorkin, Redwood City, CA (US); Jay Weinstein, Fremont, CA (US); Serge Krasnyansky, Sunnyvale, CA (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 138 days.

(21) Appl. No.: 10/996,877

(22) Filed: Nov. 23, 2004

(65) Prior Publication Data

US 2005/0131899 A1 Jun. 16, 2005

Related U.S. Application Data

(60) Provisional application No. 60/529,158, filed on Dec. 12, 2003.

(51) Int. Cl.
*G06F 12/00* (2006.01)
*G06F 17/30* (2006.01)

(52) U.S. Cl. .......................................... 710/200; 707/8

(58) Field of Classification Search ................ 710/200, 710/240; 709/225; 711/115; 707/8
See application file for complete search history.

(56) References Cited

U.S. PATENT DOCUMENTS

| | | | | |
|---|---|---|---|---|
| 5,263,155 A | | 11/1993 | Wang | |
| 5,572,734 A | * | 11/1996 | Narad et al. ................. | 710/200 |
| 5,734,909 A | * | 3/1998 | Bennett ........................ | 710/200 |
| 5,790,851 A | * | 8/1998 | Frank et al. .................. | 718/104 |
| 5,872,980 A | * | 2/1999 | Derrick et al. ............... | 710/200 |
| 5,968,153 A | * | 10/1999 | Wheeler et al. ............. | 710/110 |
| 5,983,225 A | * | 11/1999 | Anfindsen ...................... | 707/8 |
| 6,199,094 B1 | * | 3/2001 | Presler-Marshall .......... | 718/104 |
| 6,247,025 B1 | * | 6/2001 | Bacon .......................... | 707/206 |
| 6,381,663 B1 | * | 4/2002 | Morrison et al. ............ | 710/108 |
| 6,556,994 B1 | | 4/2003 | Zheng et al. | |
| 6,658,510 B1 | * | 12/2003 | Bartucca ...................... | 710/107 |
| 6,725,457 B1 | * | 4/2004 | Priem et al. .................. | 718/104 |
| 7,007,122 B2 | * | 2/2006 | Solomon et al. ............. | 710/240 |
| 7,047,337 B2 | * | 5/2006 | Armstrong et al. .......... | 710/200 |
| 7,085,852 B2 | * | 8/2006 | Kumar et al. ................ | 709/248 |
| 7,437,612 B1 | * | 10/2008 | Cantrill ........................ | 714/37 |
| 2002/0138483 A1 | | 9/2002 | Bretl et al. | |
| 2003/0018785 A1 | * | 1/2003 | Eshel et al. .................. | 709/226 |
| 2003/0065676 A1 | * | 4/2003 | Gbadegesin et al. ...... | 707/104.1 |
| 2003/0101300 A1 | * | 5/2003 | Goldick ....................... | 710/200 |
| 2003/0145035 A1 | * | 7/2003 | de Bonet ..................... | 709/102 |
| 2004/0215858 A1 | * | 10/2004 | Armstrong et al. .......... | 710/200 |
| 2004/0260852 A1 | * | 12/2004 | Olstad et al. ................. | 710/200 |
| 2007/0198517 A1 | * | 8/2007 | Bresch et al. .................. | 707/8 |

* cited by examiner

*Primary Examiner*—Khanh Dang
*Assistant Examiner*—Christopher A Daley

(57) ABSTRACT

Providing concurrent access to a set of shared resources is disclosed. An attempt is made, at the time it becomes necessary to use each resource required to perform an operation or set of operations, to lock the resource. For each attempt to lock a required resource, information associated with the attempt to lock the resource is stored. In the event a lock cannot be obtained with respect to a required resource, a renewed attempt to perform the operation or set of operations is initiated. At the outset of the renewed attempt, an attempt is made to lock all of the required resources that were locked or attempted to be lock during the previous attempt to perform the operation or set of operations.

20 Claims, 4 Drawing Sheets

400

[ A, B, E ]

ADAPTIVE OBJECT LEVEL LOCKING

CROSS REFERENCE TO OTHER APPLICATIONS

This application claims priority to U.S. Provisional Patent Application No. 60/529,158 entitled ADAPTIVE OBJECT LEVEL LOCKING filed Dec. 12, 2003 which is incorporated herein by reference for all purposes.

FIELD OF THE INVENTION

The present invention relates generally to concurrent use of resources. More specifically, adaptive locking of concurrently used resources is disclosed.

BACKGROUND OF THE INVENTION

Concurrent use of shared resources is commonplace. In antiquity, townspeople lined up at a common well to draw water for their respective families. In modem life, and in particular in the realm of information technology, processors, memory, data, software objects, network connections, and numerous other resources may be shared by many users. Such users may be people, systems, applications or other programs, software objects, processing threads, database transactions, or any other entity that may be configured to draw on a shared resource in some way.

In certain circumstances, it may be critical that at any given time only one user be allowed to use a shared resource in a way that changes the state of the resource. For example, in the case of a shared set of data, such as may be stored in a relational or other database, to preserve the integrity and consistency of the data it may be necessary to ensure that two or more users do not separately read and then subsequently attempt to update the same data value at the same time. To illustrate, in the case of a credit card transaction authorization system, different transactions running on the system may require access to the same data value, such as to verify that an account will not exceed the credit limit if a transaction is completed. Assume a first transaction reads the current balance information from a database and while the first transaction is determining if the first transaction is allowed under the credit limit a second transaction reads the same current balance information and begins to make a similar determination with regard to the second transaction. Suppose the first transaction determines that the transaction should be approved, because it will increase the pending balance to be exactly equal to the credit limit. Under this scenario, the second transaction might be approved, based on the stale current balance data previously read from the database (i.e., before it was updated by the first transaction), resulting in the second transaction being approved when in fact it should have been rejected. Worse still, if the second transaction is permitted to update the current balance value to reflect the previously read (and now stale) current balance data value and the amount of the second transaction, the update made by the first transaction may be lost.

To avoid such problems, both in the context of accessing shared data and in the context of other shared resources, various schemes have been employed. In one typical approach, for example, the second transaction above might not have been permitted to update the current balance data value based on the previously read current balance data that did not reflect the update by the first transaction. In such an approach, the second transaction might fail and have to retry, in which case the updated current balance information (reflecting the first transaction) would be read and used by the second transaction to make its decision. In another typical approach, the first transaction might "lock" one or more data records associated with the current balance information, thereby preventing the second transaction (or any other transaction) from accessing the locked records. Once the first transaction has been completed, the lock is released and the record(s) become available to be locked and used exclusively by the second and/or other transactions.

One potential shortcoming of using locks to provide for exclusive, serial concurrent use of shared resources is that while one user has a resource locked the resource is not available to be used by other users, even if the user holding the lock is not at a given moment actively performing operations using the resource. Under such an approach, transactions locked out of using needed resources may fail and have to be retried more frequently than if locks had not been used. This potential shortcoming may be exacerbated in contexts in which to perform a related set of operations a user may need to employ a plurality of shared resources asynchronously. For example, if a user needs to perform in series a set of operations comprising a first operation using resource A, a second operation using resource B, and a third operation using resource C, the set of operations could fail (and possibly the whole series of operations retried) if any of the resources A, B, and/or C is found to have been locked by another user such that it is not available to the user when needed. In fact, the set of operations could fail repeatedly if on each attempt at least one of the resources is found to have been locked by another user at the time it is needed.

When it may be necessary to use more than one shared resource to perform an operation or a related set or series of operations, as described above, two approaches have been used. In the first, the user may identify all the resources the user will need to perform the operation(s) and then attempt to lock all of the resources in advance. In this way, the user can be sure that each resource will be available to it when needed. The shortcomings of this approach include that the user may lock the resources longer than needed, thereby depriving other users of their use for longer than would otherwise be necessary. Also, this approach requires the user to identify in advance all of the shared resources the user will need, which may require excessive time or effort (computational resources, e.g.) and which may not be possible in all cases (such as where the identity of resource cannot be determined until after on or more operations of the set have been performed. Another typical approach is to have the user lock resources only as they are needed, but this approach suffers from the shortcoming identified above, in that some of the operations may be completed only to find that the related set of operations fails and has to be retried because a lock could not be obtained as required for a subsequent operation of the set.

Therefore, there is a need for a better way to provide concurrent use of shared resources, especially in contexts in which one or more users may need access to a plurality of shared resources to perform an operation or set of related operations.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and invention may be practiced according to the claims without some or all of these specific details. For the purpose of clarity, technical material that is known in the technical fields related to the invention has not been described in detail so that the invention is not unnecessarily obscured.

Figure 1:
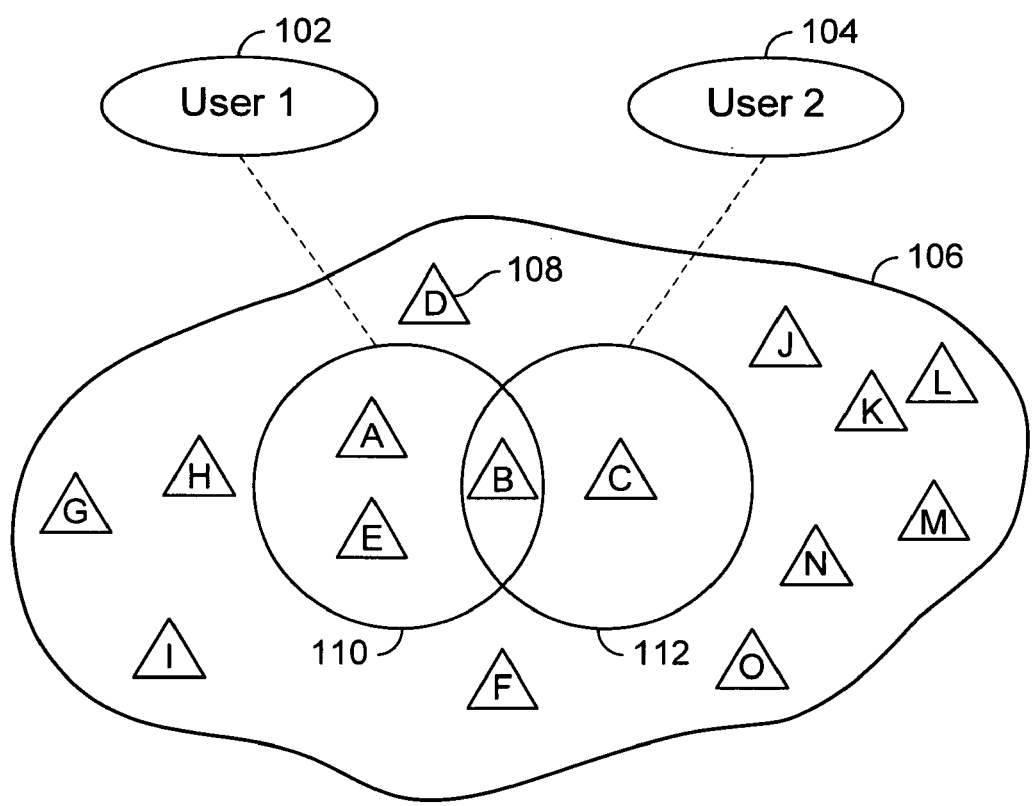
FIG. 1 is a schematic diagram illustrating the concurrent use of shared resources and potential problems associated therewith.

FIG. 1 is a schematic diagram illustrating the concurrent use of shared resources and potential problems associated therewith. A first user 102 and a second user 104 are shown as having concurrent access to a body of shared resources 106. The body of shared resources 106 comprises a plurality of shared resources 108, each represented in FIG. 1 by a triangle identified by a unique letter. Shared resources A through O are shown in FIG. 1. In the example shown, it is assumed that the first user 102 is to perform a set of operations requiring serial access to resources A, B, and E, in that order, as indicated in FIG. 1 by the first user resource pool 110. It is further assumed that the second user 104 is to perform a set of operations at or about the same time requiring serial access to resources B and C, in that order, as indicated in FIG. 1 by the second user resource pool 112. As can be seen visually from the intersection of the first user resource pool 110 and the second user resource pool 112 in FIG. 1, the shared resource B is needed by both the first user 102 and the second user 104.

If in the example shown in FIG. 1 the first user 102 locks just resource A while performing operations using resource A and then only attempts to lock resource B when resource B is needed for a subsequent stage of the operation or set of operations being performed, the first user 102 may find at the time that it attempts to lock resource B that resource B has already been locked by the second user 104. Depending on the circumstances and configuration, the operation(s) being performed by the first user may then fail, and the entire operation or set of operations may have to be retried. If, on the other hand, the first user 102 had locked all of the resources it would need (i.e., resources A, B, and E), the resource B, for example, may have been locked at the time the second user 104 needed to use it, even if the first user 102 were not using the resource at the particular time that the second user 104 needed it. Also, as noted above, depending on the circumstances it may not be possible for the first user 102, or it may be expensive in some relevant sense for the first user 102, to identify in advance all of the resources it will need to complete the series of operations. For example, it might be possible to determine that resources A and B will be needed but difficult or impossible to determine in advance that resource E will also be needed (e.g., because the identity of resource E depends on one or more operations that first must be performed using resources A and/or B).

Figure 2:
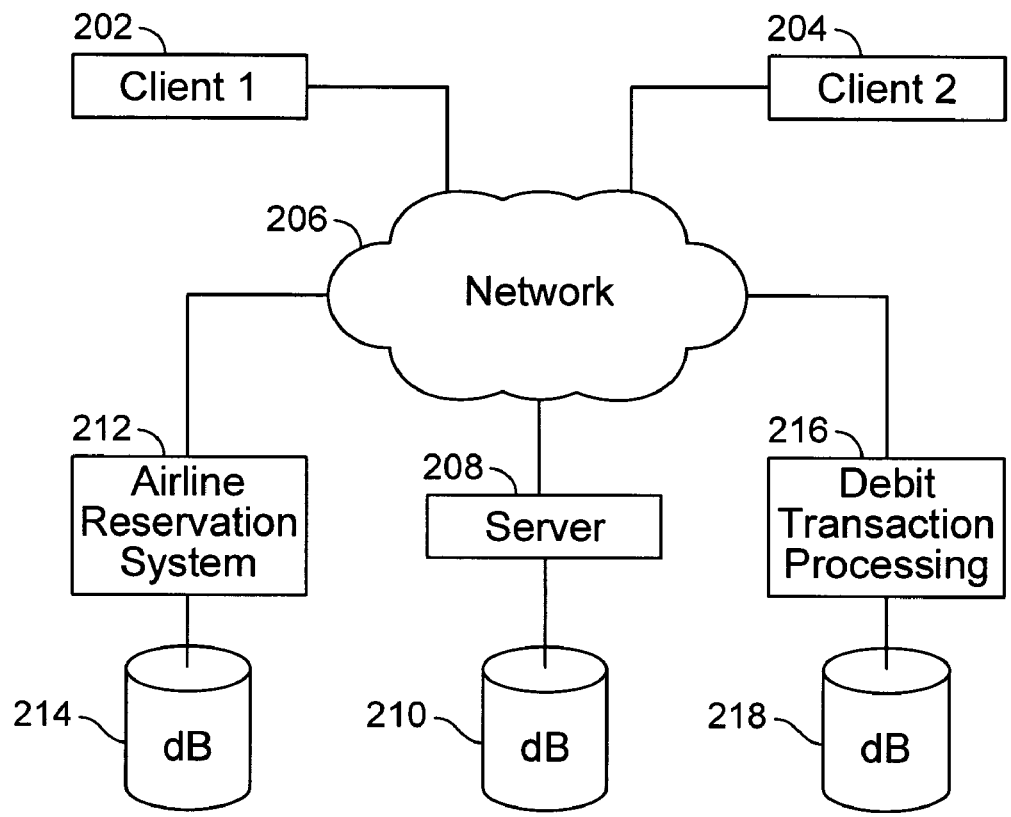
FIG. 2 is a schematic diagram illustrating the concurrent use of shared resources and potential problems associated therewith in the context of resources associated with a computer network.

FIG. 2 is a schematic diagram illustrating the concurrent use of shared resources and potential problems associated therewith in the context of resources associated with a computer network. A first client 202 and a second client 204 are connected to a network 206, which may be a public or private network, such as the Internet or a local area network (LAN). An e-commerce server 208 is also connected to the network 206 and is accessible by the first and second clients 202 and 204 via the network. The server 208 has a connection to a transaction database 210, used to store data associated with transactions completed via the server 208. In this example, the server 208 may be configured to make airline reservations and process associated purchase transactions. An airline reservation system 212 (e.g., a system maintained by an airline for purposes of tracking reservations and seat assignments on its flights) is connected to the network 206 and to a reservations database 214. A debit transaction processing system 216 is connected to the network 206 and to an account database 218. In this example, the server 208 is configured to process requests for airline reservations received from clients by communicating via the network 206. The server 208 is further configured to process purchase transactions for airline tickets by communicating via network 206 with both the airline reservation system 212 and the debit transaction processing system 216. (For simplicity, it is assumed in this example that airline tickets are purchased only through debit transactions using funds from accounts associated with the debit transaction processing system 216.) In the environment shown in FIG. 2, the first and second clients 202 and 204 could find themselves competing for use of shared resources in any number of possible ways. For example, the first and second clients 202 and 204 may each desire to make a reservation on or select seats at the same time for the same flight, or they may each wish to complete a purchase transaction using a debit account of which they are joint owners. Assume, for example, that the first client 202 wishes to make a reservation on Flight 100, purchase a ticket for the reservation, and make a seat selection. At or about the same time, the second client 204 desires to make payment for a previously-made reservation and select a seat for the same Flight 100. Assume further for the sake of illustration that the first client 202 and the second client 204 seek to make their purchases using the same debit account via the network 206 using a travel reservation and payment service made available through server 208. Only the first client 202 (or the process or thread running on server 208 that is associated with the first client 202) needs access to the resources required to make a new reservation on Flight 100, since the second client 204 already has a reservation. However, each needs access to the resources associated with the debit transaction processing system 216 and account database 218 that may be necessary to purchase their ticket (e.g., the second client 204 cannot be permitted to complete its transaction if insufficient funds remain after the first client 202 has completed its transaction) and each needs access to the resources associated with the airline reservation system 212 and reservations database 214 that may be needed to select their seat (e.g., the second user cannot be allowed to select the same seat as the first user). Considering the first of the two approaches to locking described above (i.e., lock all resources at the start), the first client 202 would have to lock the resources required to make a reservation, the resources required to charge the ticket to the debit account, and the resources required to select a seat before the first client even made a reservation on Flight 100. In the interim, the second client 204 would be locked out, possibly needlessly, from completing its purchase and seat selection operations. If the second approach were instead used, the first client 202 might find after making a reservation that the resources needed either to complete the purchase transaction or to select a seat might not be available when needed, resulting in the need to retry possibly the entire operation (depending on the configuration).

The conflicts illustrated by the examples described above in connection with FIGS. 1 and 2 could arise in any environment in which two or more users may contend for the exclusive use of shared resources.

A hybrid approach to providing serial concurrent access to shared resources is disclosed. Under this hybrid approach, an attempt is first made to complete an operation or set of operations requiring access to a plurality of shared resources by locking each resource only as it is needed. As each lock is attempted, the lock and/or associated data is remembered or stored. In some embodiments, each lock attempt is stored in a data structure referred to as a "lock vector". The data stored in the lock vector may be the lock request itself, an identifier for the resource, the resource itself, and/or any other data sufficient to enable the associated resource to be locked in a subsequent retry. If a lock attempt fails, a retry is initiated. During the retry, an attempt is made to lock at the outset all of the locks in the lock vector. If the attempt succeeds, the remainder of the operation or set of operations proceeds as before, with subsequently needed resources being locked as they are needed and data associated with lock attempts added to the lock vector as lock attempts are made. In this way, a hybrid between the "lock all resources at the outset" approach and the "lock as you go" approach is used to ensure that operations (or sets of operations) requiring access to a plurality of shared resources are completed in a timely manner, even if other users are attempting at the same time to use one or more of the plurality of shared resources.

Figure 3:
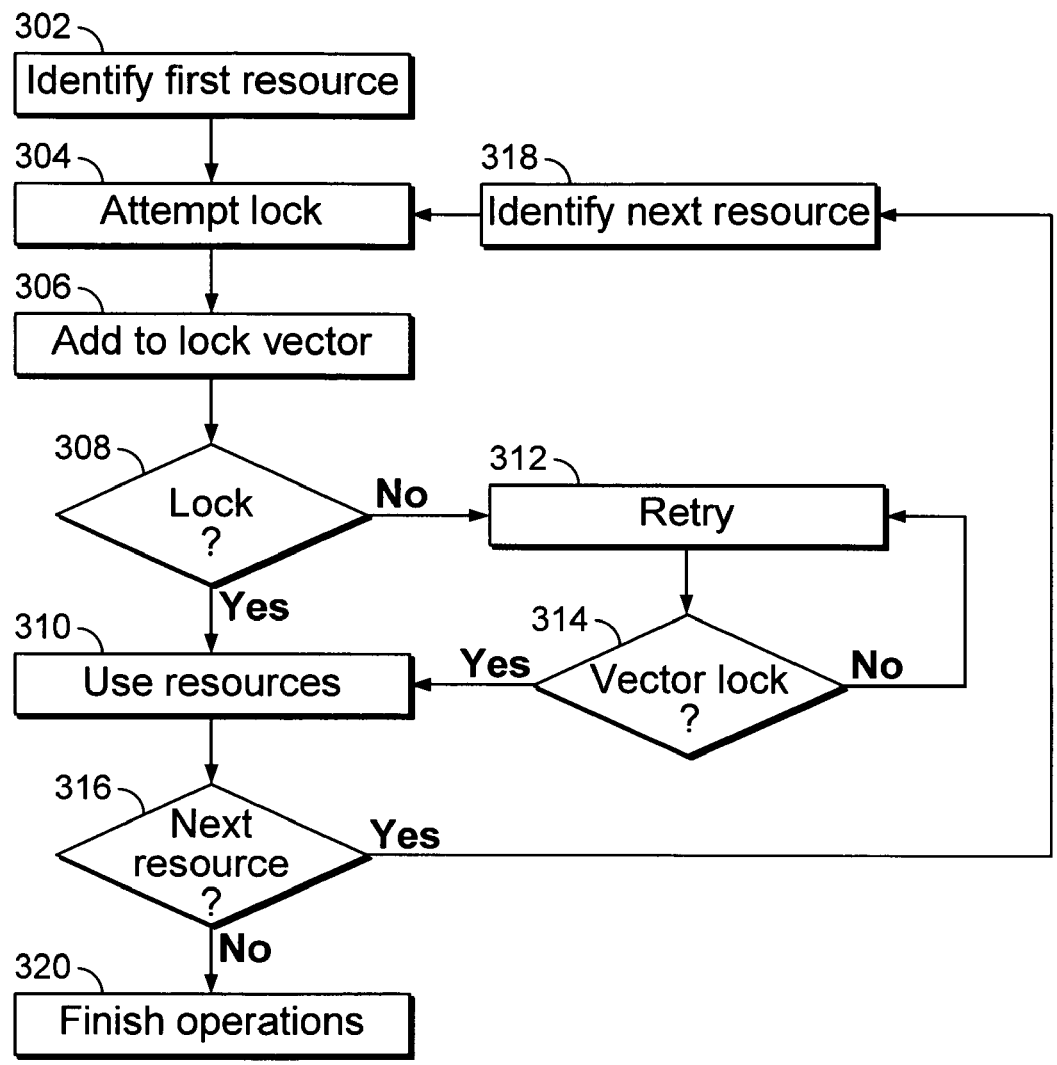
FIG. 3 is a flow chart illustrating a process used in one embodiment to provide serial concurrent access to share resources using a hybrid of the "lock all resources at the outset" and "lock as you go" approaches.

FIG. 3 is a flow chart illustrating a process used in one embodiment to provide serial concurrent access to share resources using a hybrid of the "lock all resources at the outset" and "lock as you go" approaches. In step 302, a first required resource is identified. In step 304, an attempt is made to lock the first resource. In step 306, the lock attempt or other data associated with the lock attempt and/or the resource on which the lock attempt is being made is added to a lock vector. In step 308, it is determined whether or not the lock attempt made in step 304 was successful. If the lock attempt was successful, the process advances to step 310 in which the first resource and/or any subsequently locked resource(s) is/are used to perform the operation or component operations of a set of related or interdependent operations. If it is determined in step 308 that the lock attempt of step 304 was not successful, the process proceeds to step 312, in which a retry is initiated with respect to the operation (or set of operations).

The retry comprises first attempting to lock all of the resources identified in (or associated with data in) the lock vector. In step 314, it is determined whether a lock was obtained successfully with respect to all resources associated with data in the lock vector. If all of the resources associated with data in the lock vector could not be locked, the process returns to step 312 in which a further retry is initiated. Those of skill in the art will recognize that the retry step 312 may comprise logic to limit the number of retries attempted before aborting an operation (or set of operations), or other logic to improve the chances of obtaining a subsequent lock on the resources associated with data in the lock vector, such as by implementing a wait period before initiating the next retry. If it is determined in step 314 that the resources associated with data in the lock vector were locked successfully, the process proceeds to step 310, in which the locked resources are used to perform the operation(s). In step 316 it is determined whether a further resource is needed to continue to process the operation (or set of operations). If it is determined in step 316 that a further resource is needed, the process proceeds to step 318, in which the next resource needed to process the operation (or set of operations) is identified. The process then returns to step 304, in which an attempt is made to lock the resource identified in step 318, followed by a further iteration of steps 306 and 308. Subsequent iterations of steps 304, 306, 308, 310, 316, and 318 (if no conflict prevents subsequently needed resources from being locked) and/or steps 304, 306, 308, 312, 314, 310, 316, and 318 (if one or more retries are necessary) are performed until such time as it is determined in step 316 that no further resources will be needed, at which time the process advances to step 320 in which the operation (or set of operations) is finished and the process ends.

In some alternative embodiments, if it is determined in step 316 that no additional resources are needed at a particular time the process returns to step 310 in which previously locked resources are used to continue to perform the operation (or set of operations), and the process advances to step 320 and ends only when it is determined that all of the operations have been completed. In some embodiments, step 320 may comprise releasing the locks obtained during the processing of the operation(s).

Figures 4, 5:
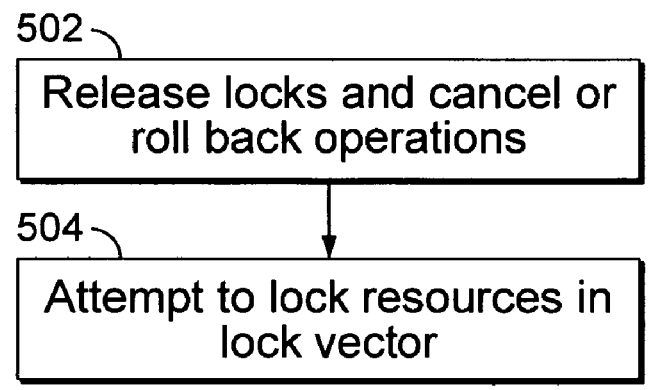
FIG. 4 is an illustration of a lock vector such as may be used in some embodiments.
FIG. 5 is a flow chart illustrating a process used in some embodiments to initiate a retry using data in a lock vector.

FIG. 4 is an illustration of a lock vector such as may be used in some embodiments. The lock vector 400 is shown as containing data associated with resources A, B, and E, which are the resources described above in connection with FIG. 1 as being required by the first user 102. In operation, the vector would first contain no data. Data associated with resource A would be added when an attempt was made to lock that resource. Subsequently, data associated with resource B and later resource E would be added as attempts were made to lock those resources. If at any point a needed resource could not be locked, a retry would be initiated, which would begin with an attempt to lock all the resources associated with data then contained in the lock vector 400.

FIG. 5 is a flow chart illustrating a process used in some embodiments to initiate a retry using data in a lock vector. In some embodiments, step 312 of FIG. 3 comprises the process of FIG. 5. In step 502, locks obtained during the previous attempt to complete the operation(s) are released, and any modifications to such resources are canceled and/or undone. In step 504, an attempt is made to lock the resources associated with data stored in the lock vector. As described above, for any particular retry the lock vector will comprise data associated with resources that were either locked or attempted to be locked in a previous attempt to perform the operation(s).

To further illustrate the techniques described herein, two examples are presented below.

EXAMPLE 1

Referring further to FIG. 1, as noted above under the "lock all at the outset" approach the first user 102 would lock resources A, B, and E prior to commencing to performing the operation(s) it needs to perform using and/or on those resources. Under the "lock as you go" approach, the first user would lock first resource A and would later lock resources B and E, respectively, as the need to use those resources arose in the course of performing the operation(s). Under the hybrid approach described herein, in some embodiments, such as one using the process as shown in FIG. 3, the first user would begin by identifying resource A as the first resource needed and attempting to lock resource A (steps 302 and 304). Data associated with resource A and/or the lock attempt will be stored in a lock vector associate with the operation(s), such that the contents of the lock vector can be represented as [A]. Assume for this example that the lock on resource A was successful, which would result in operations being performed on or using resource A (steps 308 and 310). At some point, it is determined that a further resource is needed (step 316). The required resource is identified as being resource B (step 318), and an attempt is made to lock resource B (step 304). Data associated with resource B is then added to the lock vector, which can now be represented as [A, B]. In this example, the lock on resource B could not be obtained (step 308), for example because the second user 104 had already locked resource B for its own use. As a result, a retry is initiated (step 312). The retry comprises an attempt to lock at the outset of the retry all the resources associated with data stored in the lock vector, in this case resources A and B. If a lock is obtained (step 314), the locked resources are used to perform the operations until such time as it is determined that a further resource is needed (step 316), or it is determined that no further resources will be needed (in which case the operation(s) is/are finished and end in step 320). If a further resource is needed, as is the case in this example, the next resource needed is identified (step 318), in this case it is resource E, and an attempt is made to lock resource E. Assuming no conflict, resource E will be locked, and the locked resources used to perform and finish the operation(s).

EXAMPLE 2

Referring further to FIG. 2, assume the first client 202 wants to make a reservation on Flight 100, immediately purchase a ticket based on the reservation, and select his/her seat. Further assume the second client 204 wants to purchase a ticket for Flight 100 based on a reservation made earlier using the same debit account as the first client 202 (on which the first and second clients are assumed to be co-owners), and to select his/her seat on the flight. For ease of reference, the resources associated with making reservations on Flight 100 will be referred to as resource 212-A, the resources associated with the debit account will be referred to as resource 216-A, and the resources associated with selecting seats on Flight 100 will be referred to as resource 212-B. To make his/her reservation, the first client 202 attempts to lock resource 212-A (steps 302 and 304). Data associated with resource 212-A is stored in a lock vector (step 306), the resulting state of which may be represented as [212-A]. If the lock is obtained successfully (step 308), the resource 212-A is used to perform the operation(s) (step 310), in this case to make a reservation for the first client 202. It would then be determined that to purchase a ticket on the reservation, a further resource, i.e., the debit account data, is needed (step 316). The further resource is identified (step 318), such as by receiving from the first client 202 an account or bank routing number and/or other data identifying resource 216-A as the further resource needed, and an attempt is made to lock the resource 216-A (step 304). The lock vector is updated to reflect the further lock attempt, resulting in the state [212-A, 216-A]. In this example, assume that the lock attempt failed, for example because the second client 204 had already locked the resource to purchase his/her own ticket on Flight 100 (step 308). A retry would then be initiated (step 312), the retry comprising an attempt to lock at the outset of the retry the resources associated with data in the lock vector, in this case resources 212-A and 216-A. If the attempt to lock the resources associated with the data in the lock vector were successful, the locked resources would be used in a renewed effort to perform the desired operation(s), in this case making the reservation on Flight 100 and purchasing a ticket based on that reservation. If it is later determined that yet a further resource is required, such as the seating data for Flight 100, i.e., resource 212-B (steps 316 and 318), an attempt would be made to lock the further resource (step 304). Data associated with the further resource would be added to the lock vector, in this case resulting in a state of [212-A, 216-A, 212-B] for the lock vector. Assume that in this case the resource 212-B could not be locked, e.g., because the second client had already locked that resource to make his/her seat selection. In such circumstances, a retry would be attempted (step 312) as described above. The retry would comprise attempting to lock at the outset of the retry all of the resources associated with data in the lock vector, in this case resources 212-A, 216-A, and 212-B. Once the resources associated with data in the lock vector were locked successfully, the resources would be used to perform the desired operation(s) (step 310), and if no further resources were needed (as in this example) the operation(s) would be completed and the process would end (steps 316 and 320).

As the above discussion and the examples immediately above show, the approach described herein combines the advantages and mitigates the disadvantages of the "lock everything at the outset" and "lock as you go" approaches to managing serial concurrent access to shared resources. By attempting to complete an operation or set of operations to the extent possible using the "lock as you go" approach, locking resources for longer than necessary and the need to determine in advance which resources will be required to complete an operation or set of operations are avoided. At the same time, use of a lock vector or its equivalent to lock at the outset of a retry those resources identified in prior attempts as being necessary to perform the desired operation(s) makes use of information learned in such prior attempts to increase the likelihood that the retry will be successful, e.g., by avoiding the risk that one of the resources now known to be required will be locked by another user before a lock is obtained during the course of the retry.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for providing to a plurality of users concurrent access to a set of shared resources, comprising:
   for an operation or set of operations requiring access to one or more of said shared resources by one of said plurality of users:

(a) attempting to lock each required resource at the time it becomes necessary to use the resource in performing the operation or set of operations;

(b) storing for each attempt to lock a required resource information associated with the attempt to lock the resource; and (c) in the event a lock cannot be obtained with respect to a required resource, initiating a renewed attempt to perform the operation or set of operations, the renewed attempt comprising using the stored information, at the outset of the renewed attempt to perform the operation or set of operations and prior to performing again one or more tasks of the operation or set of operations that were already performed in the previous attempt to perform the operation or set of operations, to lock or attempt to lock all of the required resources that were locked or attempted to be locked during the previous attempt to perform the operation or set of operations; in the event all of the required resources that were locked or attempted to be locked during the previous attempt to perform the operation or set of operations are successfully locked, using the locked resources to perform said one or more tasks of the operation or set of operations that were already performed in the previous attempt to perform the operation or set of operations and one or more attempted tasks, if any, associated with any resource that was unsuccessfully attempted to be locked in the previous attempt; and subsequently locking or attempting to lock each subsequently required resource, if any, required to complete one or more further, not previously completed or attempted tasks comprising the operation or set of operations, at the time it becomes necessary to use that subsequently required resource.

2. The method of claim 1, wherein attempting, at the outset of the renewed attempt to perform the operation or set of operations, to lock all of the required resources that were locked or attempted to be locked during the previous attempt comprises using the information associated with attempts to lock the required resources stored during the previous attempt to perform the operation or set of operations.

3. The method of claim 1, wherein the renewed attempt to perform the operation or set of operations comprises attempting to lock any further resources that may be required to perform the operation or set of operations that were not locked or attempted to be locked during the previous attempt to perform the operation or set of operations as it becomes necessary to use such further resources.

4. The method of claim 3, further comprising adding to the information stored in the previous attempt concerning attempts to lock resources during the previous attempt information associated with attempts during the renewed attempt to lock further resources.

5. The method of claim 1, further comprising rolling back, in the event a lock cannot be obtained with respect to a required resource, any partially completed operations or portions thereof performed with respect to previously-locked resources and unlocking any such previously-locked resources prior to initiating the renewed attempt to perform the operation or set of operations.

6. The method of claim 1, wherein the information associated with the attempt to lock the resource comprises information associated with resource.

7. The method of claim 6, wherein the information associated with the resource comprises an identifier associated with the resource.

8. The method of claim 1, wherein the information associated with the attempt to lock the resource comprises information associated with the lock attempt.

9. The method of claim 1, wherein the information associated with the attempt to lock the resource is stored in a data structure.

10. The method of claim 9, wherein the data structure comprises a lock vector.

11. The method of claim 1, wherein the set of shared resources comprises a plurality of data objects.

12. The method of claim 1, further comprising, in the event a lock cannot be obtained with respect to a required resource, rolling back any operation or portion thereof completed during the failed attempt the perform the operation or set of operations and unlocking any locked resources prior to initiating the renewed attempt.

13. The method of claim 1, further comprising performing steps (a), (b), and (c) with respect to each operation or set of operations requiring access to one or more of said shared resources by one of said plurality of users.

14. The method of claim 1, further comprising repeating steps (a), (b), and (c) with respect to the operation or set of operations until the operation or set of operations has been completed successfully.

15. A system for providing access to a set of shared resources to which a plurality of users have concurrent access, comprising:

a communication interface configured to permit access to said set of shared resources;

a memory configured to store information concerning attempts to lock one or more of said shared resources; and a processor configured to:
attempt to lock, at the time it becomes necessary to use the resource, each of said shared resources as may be required to perform an operation or set of operations;

store in said memory for each attempt to lock a required resource information associated with the attempt to lock the resource; and in the event a lock cannot be obtained with respect to a required resource, initiate a renewed attempt to perform the operation or set of operations, the renewed attempt comprising using the stored information, at the outset of the renewed attempt and prior to performing one or more tasks of the operation or set of operations that were already performed in the previous attempt to perform the operation or set of operations, to lock or attempt to lock all of the required resources that were locked or attempted to be lock during the previous attempt to perform the operation or set of operations; in the event all of the required resources that were locked or attempted to be locked during the previous attempt to perform the operation or set of operations are successfully locked, using the locked resources to perform said one or more tasks of the operation or set of operations that were already performed in the previous attempt to perform the operation or set of operations and one or more attempted tasks, if any, associated with any resource that was unsuccessfully attempted to be locked in the previous attempt; and subsequently locking or attempting to lock each subsequently required resource, if any, required to complete one or more further, not previously completed or attempted tasks comprising the operation or set of operations, at the time it becomes necessary to use that subsequently required resource.

16. A computer program product for providing to a plurality of users concurrent access to a set of shared resources, the computer program product being embodied in a computer readable medium and comprising computer instructions for:
for an operation or set of operations requiring access to two or more of said shared resources by one of said plurality of users;
attempting to lock each required resource at the time it becomes necessary to use the resource in performing the operation or set of operations;
storing for each attempt to lock a required resource information associated with the attempt to lock the resource;
and in the event a lock cannot be obtained with respect to a required resource, initiating a renewed attempt to perform the operation or set of operations, the renewed attempt comprising using the stored information, at the outset of the renewed attempt to perform the operation or set of operations and prior to performing again a task one or more tasks of the operation or set of operations that were already performed in the previous attempt to perform the operation or set of operations, to lock or attempt to lock all of the required resources that were locked or attempted to be locked during the previous attempt to perform the operation or set of operations;
in the event all of the required resources that were locked or attempted to be locked during the previous attempt to perform the operation or set of operations are successfully locked, using the locked resources to perform said one or more tasks of the operation or set of operations that were already performed in the previous attempt to perform the operation or set of operations and one or more attempted tasks, if any, associated with any resource that was unsuccessfully attempted to be locked in the previous attempt; and subsequently locking or attempting to lock each subsequently required resource, if any, required to complete one or more further, not previously completed or attempted tasks comprising the operation or set of operations, at the time it becomes necessary to use that subsequently required resource.

17. The system of claim 15, wherein the processor is further configured to add to the information stored in the previous attempt concerning attempts to lock resources during the previous attempt information associated with attempts during the renewed attempt to lock further resources.

18. The system of claim 15, wherein the processor is further configured to roll back, in the event a lock cannot be obtained with respect to a required resource, any partially completed operations or portions thereof performed with respect to previously-locked resources and unlocking any such previously-locked resources prior to initiating the renewed attempt to perform the operation or set of operations.

19. The system of claim 15, wherein the information associated with the attempt to lock the resource is stored in a data structure comprising a lock vector.

20. The system of claim 15, wherein the processor is configured to repeat attempting to lock, storing in memory, and initiating a renewed attempt until the operation or set of operations has been completed.

* * * * *

UNITED STATES PATENT AND TRADEMARK OFFICE
CERTIFICATE OF CORRECTION

PATENT NO. : 7,594,053 B2 Page 1 of 1
APPLICATION NO. : 10/996877
DATED : September 22, 2009
INVENTOR(S) : Dvorkin et al.

It is certified that error appears in the above-identified patent and that said Letters Patent is hereby corrected as shown below:

Column 10, Line 31, Claim 15 delete "lock one or more" and insert -- lock two or more --
Column 10, Line 49, Claim 15 delete "be lock" and insert -- be locked --

Signed and Sealed this

Twenty-second Day of December, 2009

David J. Kappos
*Director of the United States Patent and Trademark Office*

UNITED STATES PATENT AND TRADEMARK OFFICE
CERTIFICATE OF CORRECTION

PATENT NO.       : 7,594,053 B2                                   Page 1 of 1
APPLICATION NO.  : 10/996877
DATED            : September 22, 2009
INVENTOR(S)      : Dvorkin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 228 days.

Signed and Sealed this

Twenty-eighth Day of September, 2010

David J. Kappos
*Director of the United States Patent and Trademark Office*